US012710669B2

(12) United States Patent
Lam et al.

(10) Patent No.: US 12,710,669 B2
(45) Date of Patent: Aug. 18, 2026

(54) LENS AND METHOD FOR RETARDING MYOPIA PROGRESSION

(71) Applicant: THE HONG KONG POLYTECHNIC UNIVERSITY, Hong Kong (CN)

(72) Inventors: Siu Yin Lam, Hong Kong (CN); Yan Yin Tse, Hong Kong (CN); Chi Ho To, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 824 days.

(21) Appl. No.: 17/753,253

(22) PCT Filed: Sep. 8, 2020

(86) PCT No.: PCT/CN2020/113880

§ 371 (c)(1),
(2) Date: Feb. 25, 2022

(87) PCT Pub. No.: WO2021/047488

PCT Pub. Date: Mar. 18, 2021

(65) Prior Publication Data

US 2022/0404639 A1 Dec. 22, 2022

Related U.S. Application Data

(60) Provisional application No. 62/899,170, filed on Sep. 12, 2019.

(51) Int. Cl.
*G02C 7/04* (2006.01)

(52) U.S. Cl.
CPC ......... *G02C 7/044* (2013.01); *G02C 2202/24* (2013.01)

(58) Field of Classification Search
CPC ................................................ G02C 2202/24
(Continued)

(56) References Cited

U.S. PATENT DOCUMENTS 7,506,983 B2 * 3/2009 To ............................ A61F 9/00 351/246
8,950,860 B2 * 2/2015 Tse ........................ G02C 7/042 351/159.41
(Continued)

FOREIGN PATENT DOCUMENTS

CN 103097940 A 5/2013
CN 103389586 A 11/2013
(Continued)

*Primary Examiner* — Zachary W Wilkes
(74) *Attorney, Agent, or Firm* — S&F/WEHRW

(57) ABSTRACT

Provided herein is concentric annular multi-zone lens for retarding myopia progression in a human eye. The lens comprises: a plurality of correcting zones for forming a focused image on a retina of the human eye so as to correct refractive error of the human eye, wherein the correcting zone having a similar refractive power; a plurality of defocusing zones for forming images anterior to the retina so as to generate myopic defocus; and a defocusing power increasing region, in which refractive powers of defocusing zones being increasingly relatively positive towards the periphery of the lens so as to generate larger amplitude of the myopic defocus at the periphery of the retina; wherein the plurality of correcting zones and the plurality of defocusing zones are alternated in the concentric annular multi-zone lens.

11 Claims, 7 Drawing Sheets

(58) Field of Classification Search
USPC ..................................................... 351/159.05
See application file for complete search history.

(56) References Cited

U.S. PATENT DOCUMENTS

| | | | | |
|---|---|---|---|---|
| 9,977,257 | B2 * | 5/2018 | Wooley | G02C 7/044 |
| 10,768,445 | B2 * | 9/2020 | Lin | G02C 7/042 |
| 12,130,504 | B2 * | 10/2024 | Qi | G02C 7/02 |
| 2006/0082729 | A1 * | 4/2006 | To | G02B 5/1895 351/159.06 |
| 2012/0033177 | A1 | 2/2012 | Sarver | |
| 2012/0062836 | A1 * | 3/2012 | Tse | G02C 7/042 351/159.41 |
| 2017/0276961 | A1 * | 9/2017 | Wooley | G02C 7/044 |
| 2019/0353929 | A1 * | 11/2019 | Lin | G02C 7/049 |
| 2022/0206320 | A1 * | 6/2022 | Qi | G02C 7/063 |

FOREIGN PATENT DOCUMENTS

| | | | | |
|---|---|---|---|---|
| CN | 104094164 | A | 10/2014 | |
| CN | 108132544 | A | 6/2018 | |
| WO | WO-2013015743 | A1 * | 1/2013 | G02C 7/042 |

* cited by examiner

LENS AND METHOD FOR RETARDING MYOPIA PROGRESSION

CROSS-REFERENCE TO RELATED APPLICATIONS

This application is a 371 application of an International Patent Application Number PCT/CN2020/113880 filed Sep. 8, 2020, which claims priority from a U.S. Provisional Patent Application No. 62/899,170 filed Sep. 12, 2019, and the disclosures of which are incorporated herein by reference in their entirety.

TECHNICAL FIELD

The present disclosure generally relates to a lens and method for retarding myopia progression.

BACKGROUND

Prevalence of myopia has been rapidly increasing worldwide in recent decades. Children suffering from myopia are getting younger these days. Lattice degeneration and snail track degeneration have been reported to be pre-dispose to further retinal complication such as retinal break and detachment at later life. The possible sequelae of retinal detachment and possibility of visual impairment or even blindness are devastating to the affected individual and family, while the economic consequences are ultimately borne largely by the community. Myopia has emerged as a worldwide public health issue and is identified as one of the immediate priorities for the elimination of avoidable blindness.

Myopia is a result of excessive eye growth. From a number of animal models, eye growth is accelerated and myopia (longer eye) is resulted when the retina receives negative (hyperopic) optical defocus, where the retinal image is consistently located behind the retina. Conversely, eye growth is inhibited and hyperopia (shorter eye) is resulted when the retina receives positive (myopic) optical defocus, where the retinal image is consistently located in front of the retina.

Besides of visual inputs on the central retina, peripheral defocus has been proposed to play a certain role in refractive development. Primate studies demonstrated that visual signals on peripheral retina can still guide ocular growth in the absence of fovea, and presenting optical defocus to peripheral retina alone could alter refractive status of the developing eyes as well. There are also others studies showed that both the central and peripheral retina contributed to the process of eye growth.

Previous studies reported the myopic children with −3 D and above have a more prolate shape of retinal profile where there is hyperopic defocus (HD) of about 1.9 D at the nasal 30° eccentricity whilst a lower amount of HD was found in children with myopia lower than −3 D. Attempt to correct this HD and further induced myopic defocus (MD) for myopia control has been studied in trials using aspheric or simultaneous dual power contact lenses have shown to be effective in retarding myopia progression to various extents. However, none of them had reported any effectiveness more than 70%. It is likely that the optical signals utilized by those interventions were not optimal in inhibiting ocular growth, and that further optimization of optical design has the potential to increase the clinical effectiveness of lens to inhibit myopia progression, probably through advanced manipulation of both central and peripheral optics.

To et al (U.S. Pat. No. 7,506,983B2) described a dual-power concentric lens (as shown in FIGS. 2A and 4) to simultaneously correct refractive error and introduce myopic defocus for inhibiting myopia progression. The design was primarily a modified Fresnel's lens with a power profile of alternating zones that produce two refractive powers. One of the power of such lens matches and corrects the distant refractive error and the other relatively positive power produce the required myopic defocus. As some of the defocusing zone overlap with pupil, the theoretical resultant image shells form throughout the central and peripheral retina. In eyes with no relative peripheral refractive error (spherical globe) or myopic peripheral refractive error (oblate globe), such optics is effective in maintain a substantial amount of myopic defocus at the peripheral and mid-peripheral retina region. However, in eyes with hyperopic relative peripheral refractive error (prolate globe), such design may not be able to maintain enough amount of myopic defocus at the periphery, as myopic defocus diminishes with retinal eccentricity.

Another conventional approach to inhibit excessive ocular growth and progression of myopia is to apply myopic defocus to the peripheral retina (or namely off-axis) but not the central retina. Such approach was described by Smith et al (U.S. Pat. No. 7,025,460B2) and has been modified into different variants. The major advantage of such design is that central visual performance lost is minimal due to the lack of a defocus image shell at the center retina. On the other hand, the clinical effectiveness is somewhat lower for the same reason.

Saw et al (WO2013015743A1) described a lens design (as shown in FIGS. 2B and 6), in which both correcting zones and defocusing zone are adjusted to be increasingly positive towards the lens periphery. Such characteristic power profile theoretically can compensate for the problem of diminishing myopic defocus at retinal periphery in prolate eyes. However, there are two major drawbacks. First, plurality of power in the correcting zone unavoidably split the correcting image shells into multiple images shells, which affects the accuracy of accommodation and promote lag of accommodation. An increased lag of accommodation may shift all image shells posteriorly, reducing the overall amount of myopic defocus and may even produce hyperopic defocus. Secondly, Saw's design did not take into account any individual variation in terms of peripheral refractive error. Without such consideration, prescribed lens may result in over-compensation or under-compensation of peripheral refractive errors, adversely affecting the desired treatment effect.

A need therefore exists for an improved lens and method for retarding myopia progression that eliminates or at least diminishes the disadvantages and problems described above.

SUMMARY

It is therefore an objective of the present disclosure to provide an improved lens and method for retarding myopia progression.

According to a general aspect of the present disclosure, the method for retarding myopia progression in a human eye includes forming a focused image on the retina of the human eye and forming defocused images anterior to the retina to generate myopic defocus.

According to one aspect of the present invention, the method for retarding myopia progression in a human eye includes providing a concentric annular multi-zone lens having correcting zones and defocusing zones. The correcting zones provide a refractive power for correcting the refractive error of the eye, and the defocusing zones employ a characteristic stepwise increment of power in the defocusing zones for compensating the diminishing myopic defocus in eyes with hyperopic peripheral refractive error.

According to certain embodiments, the lens is customized to individual eyes and the increment of power is selected based on the measured relative peripheral refractive error (RPR) of eyes.

According to certain embodiments, the correcting zones of the lens have a consistent and homogenous refractive power that does not interfere the formation of image for visual perception and can avoid impacting the accuracy of accommodation.

According to certain embodiments, the lens includes a power profile, in which the defocusing zones are increasingly more positive towards lens periphery, thus compensating the problem of diminishing peripheral myopic defocus when the lens is applied on eyes with hyperopic peripheral refractive error. The increment steps of power are selected based on the measured relative peripheral refractive errors of an individual eye, thus providing a more accurate compensation. Moreover, the refractive power of all correcting zones is kept constant, thus avoiding the undesirable impact on accommodation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

Figure 1:
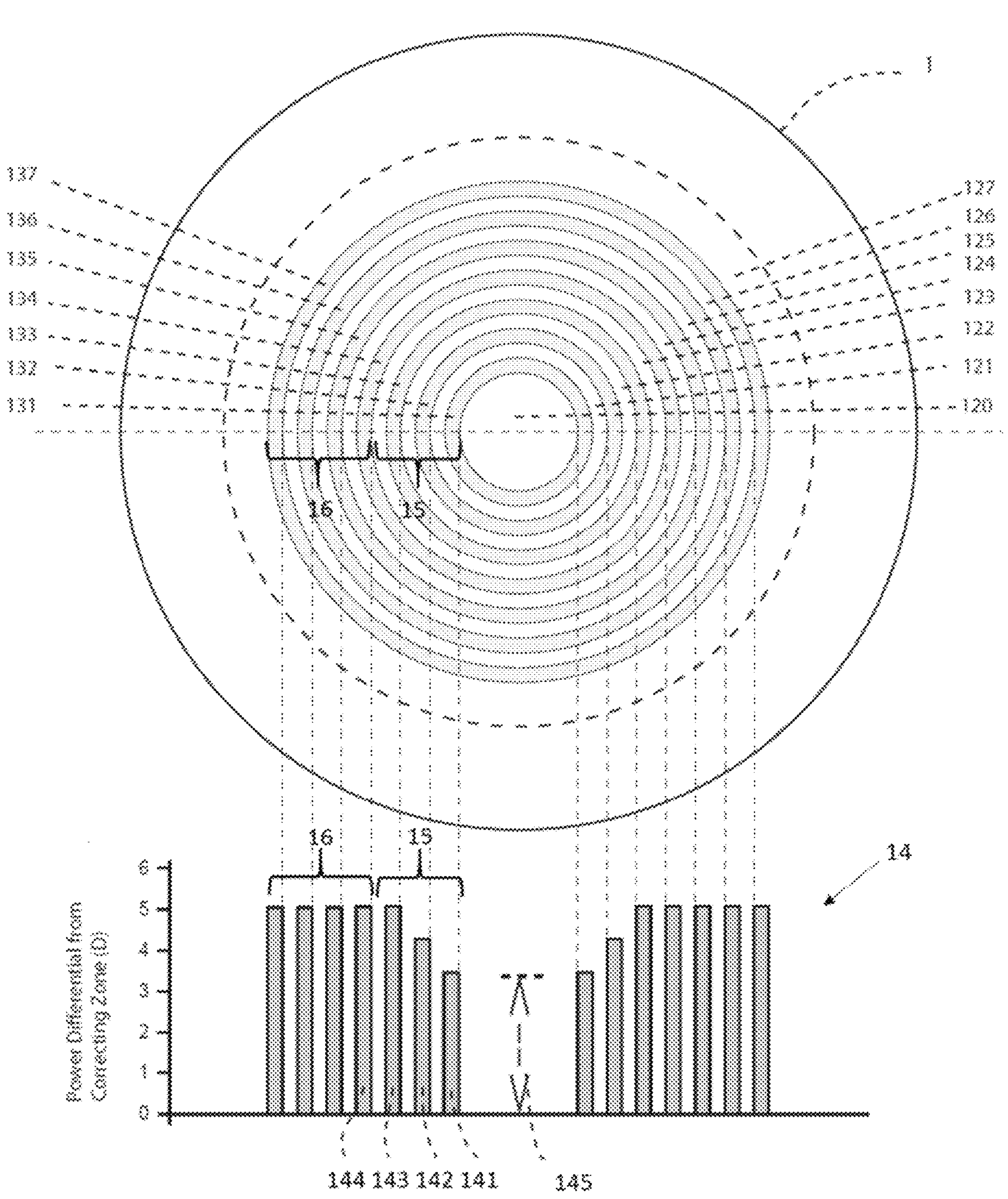
FIG. 1 shows a front view of a concentric annular multi-zone contact lens and the power profile of the contact lens according to certain embodiments of the present invention.

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present disclosure provides an improved lens and method to inhibit lower myopia from progressing into high myopia before sight threatening complications occur.

Certain embodiments of the present disclosure provide a concentric annular multi-zone lens for retarding myopia progression in a human eye. The concentric annular multi-zone lens comprises: a plurality of correcting zones for forming a focused image on a retina of the human eye so as to correct refractive error of the human eye; a plurality of defocusing zones for forming images anterior to the retina so as to generate myopic defocus; and a defocusing power increasing region, in which refractive powers of defocusing zones being increasingly relatively positive towards the periphery of the lens so as to generate larger amplitude of the myopic defocus at the periphery of the retina; wherein the plurality of correcting zones and the plurality of defocusing zones are alternated in the concentric annular multi-zone lens.

Certain embodiments of the present disclosure provide a concentric annular multi-zone lens for retarding myopia progression in a human eye. The concentric annular multi-zone lens comprises: a plurality of correcting zones for forming an posterior image shell on a retina of the human eye so as to correct refractive error of the human eye; a plurality of defocusing zones for forming multiple anterior image shells anterior to the retina so as to inhibit the myopia progression, a dioptric distance between the retina and each anterior image shell being equivalent to a myopic defocus, the plurality of correcting zones and the plurality of defocusing zones being alternated in the concentric annular multi-zone lens; and a defocusing power increasing region, in which refractive powers of defocusing zones increase positively towards the periphery of the concentric annular multi-zone lens such that one or more anterior image shells formed by one or more defocusing zones having more positive refractive power generate larger amplitude of the myopic defocus at the periphery of the retina so as to retard the myopia progression more effectively.

In certain embodiments, the refractive powers of the defocusing zones in the defocusing power increasing region are increased with a stepwise power increment depending on the measured relative peripheral refractive error of the human eye.

In certain embodiments, the stepwise power increment is between 0.25 D and 1.5 D.

In certain embodiments, the defocusing zones in the defocusing power increasing region include 2 to 10 defocusing zones.

In certain embodiments, the lens further comprises a defocusing power constant region, in which refractive powers of defocusing zones are the same In certain embodiments, the defocusing power constant region is located after the defocusing power increasing region toward the periphery of the lens.

In certain embodiments, the refractive powers of the defocusing zone in the defocusing power constant region are the same as the refractive power of the last defocusing zone in the defocusing power increasing region.

In certain embodiments, the defocusing zones in the defocusing power constant region includes 2 to 10 defocusing zones.

In certain embodiments, the defocusing zones in the defocusing power increasing region comprise a first defocusing zone and a second defocusing zone located after the first defocusing zone towards the periphery of the lens, the first defocusing zone having a first refractive power for forming a first anterior image shell, the second defocusing zone having a second refractive power being more positive than the first refractive power for forming a second anterior image located anterior to the first anterior image.

In certain embodiments, the defocusing zones in the defocusing power increasing region further comprise a third defocusing zone being located after the second defocusing zone towards the periphery of the lens, the third defocusing zone having a third refractive power being more positive than the second refractive power for forming a third anterior image shell located anterior to the second anterior image.

In certain embodiments, the defocusing zones in the defocusing power increasing region further comprise a fourth defocusing zone being located after the third defocusing zone towards the periphery of the lens, the fourth defocusing zone having a fourth refractive power being more positive than the third refractive power for forming a fourth anterior image shell located anterior to the third anterior image.

In certain embodiments, the first refractive power, the second refractive power, the third refractive power and the fourth refractive power are increased by a stepwise power increment depending on the measured relative peripheral refractive error of the human eye.

In certain embodiments, the stepwise power increment is between 0.25 D and 1.5 D.

In certain embodiments, the refractive power of the first defocusing zone is relatively more positive than the central correcting zone by 1.00 D to 4.0 D.

In certain embodiments, the plurality of correcting zones has the same refractive power.

In certain embodiments, the refractive powers of the plurality of defocusing zones are more positive than the refractive power of the plurality of correcting zones.

In certain embodiments, the concentric annular multi-zone lens is in the form of a contact lens comprising an optical surface including 4 to 40 alternating correcting and defocusing zones.

In certain embodiments, the contact lens has a central circular zone that is a first correcting zone.

In certain embodiments, the concentric annular multi-zone lens is in the form of a lens of eyeglasses, spectacles or any other vision aids.

Accordingly, the present disclosure further provides a vision aid comprising the lens described above for retarding myopia progression in a human eye. The vision aid can be a contact lens, eyeglasses, spectacles or etc.

FIG. 1 illustrate a concentric annular multi-zone contact lens 1 according to certain embodiments. The contact lens 1 comprises a central circular correcting zone 120 and eight annular correcting zones 121-127 for visual correction, and seven annular defocusing zones 131-137 for inhibiting myopia progression, based on a concentric Fresnel design. In this embodiment, the central circular correcting zone 120 is a first correction zone with a refractive power that neutralizes and corrects distant refractive errors of the lens wearer. Extending from the center to periphery, the annular correcting zones 121-127 and the annular defocusing zone 131-137 alternates with each other. The central circular correcting zone 120 is immediately surrounded by the first annular defocusing zone 131, the first annular defocusing zone 131 is immediately surrounded by the first annular correcting zone 121, the first annular correcting zone 121 is immediately surrounded by the second annular defocusing zone 132, and so on. In this embodiment, the radius of the central circular correcting zone is 1 mm, while each annulus has a pitch width of 0.25 mm except that the most peripheral correcting annulus 127 is wider.

A power profile 14 of the contact lens 1 is provided in view of peripheral refraction. The power profile 14 shows the power differential of the defocusing zones 131-137 from the correcting zones 120-127, and all of the correcting zones 120-127 have the same refractive power. Due to the individual variation of eye shape, peripheral refraction is often different from central refraction and is frequently relatively hyperopic. The contact lens 1 comprises a defocusing power increasing region 15 and a defocusing power constant region 16. The defocusing power increasing region 15 includes the annular defocusing zones 131-133, and the defocusing power constant region 16 includes the annular defocusing zones 134-137. In the defocusing power increasing region 15, the refractive powers 141-143 of the annular defocusing zones 131-133 from the center toward the periphery are increasingly positive in a stepwise manner. The selection of such increment can be based on the relative peripheral refractive errors (RPR) of the wearer measured at 15 degree (RPR15) and 25 degree (RPR25) away from the visual axis. Relative peripheral refractive error is defined as the difference between peripheral refraction and central refraction. Each lens can be made with the RPR15 and RPR25 of each eye of the wearer.

In this embodiment, the first annular defocusing zone 131 is more positive than the central circular correcting zone 120 by a baseline myopic defocus amount 145 which is 3.5 D. Assuming that RPR15 is 0.75 and RPR 25 is 1.5 D. The relative positive powers of the subsequent defocusing zone are calculated with a formula as follows:

First defocusing zone 131:=baseline=3.50 D

Second defocusing zone 132: baseline+RPR15=baseline+0.75 D=4.25 D

Third defocusing zone 133 and thereafter: baseline+RPR25=baseline+1.50 D=5.00 D

In the defocusing power constant region 150, the annular defocusing zones 134-137 have the same refractive power 144 and their power differential from the correcting zone is 5.0 D.

It is understood that the above formula can be slightly modified to achieve the same purpose without deviating from the spirit and scope of the present application. For the sake of conciseness, the above formula is represented by the illustrations. Nevertheless, the preferred defocusing powers for the second and third defocusing zones should not be more positive than the first defocusing zone by 1.50 D and 3.0 D respectively.

Table 1 below shows different defocusing powers of defocusing zones 1-7 with different formula samples according certain embodiments.

TABLE 1

| Formula | Peripheral refraction (D) | | Defocusing zones 1-7 (defocusing power (D)) | | | | | | |
|---|---|---|---|---|---|---|---|---|---|
| samples | RPR15 | RPR25 | 1 (BL) | 2 | 3 | 4 | 5 | 6 | 7 |
| i | 0.75 | 1.50 | 3.50 | 4.25 | 5.00 | 5.00 | 5.00 | 5.00 | 5.00 |
| | 1.25 | 2.50 | 3.50 | 4.75 | 6.00 | 6.00 | 6.00 | 6.00 | 6.00 |
| ii | 0.75 | 1.50 | 3.50 | 4.25 | BL + (RPR15 + RPR25)/2 | 5.00 | 5.00 | 5.00 | 5.00 |
| | 1.25 | 2.50 | 3.50 | 4.75 | BL + (RPR15 + RPR25)/2 | 6.00 | 6.00 | 6.00 | 6.00 |
| iii | 0.75 | 1.50 | 3.50 | BL + RPR15/2 | 4.25 | BL + (RPR15 + RPR25)/2 | 5.00 | 5.00 | 5.00 |
| | 1.25 | 2.50 | 3.50 | BL + RPR15/2 | 4.75 | BL + (RPR15 + RPR25)/2 | 6.00 | 6.00 | 6.00 |

Figure 2A:
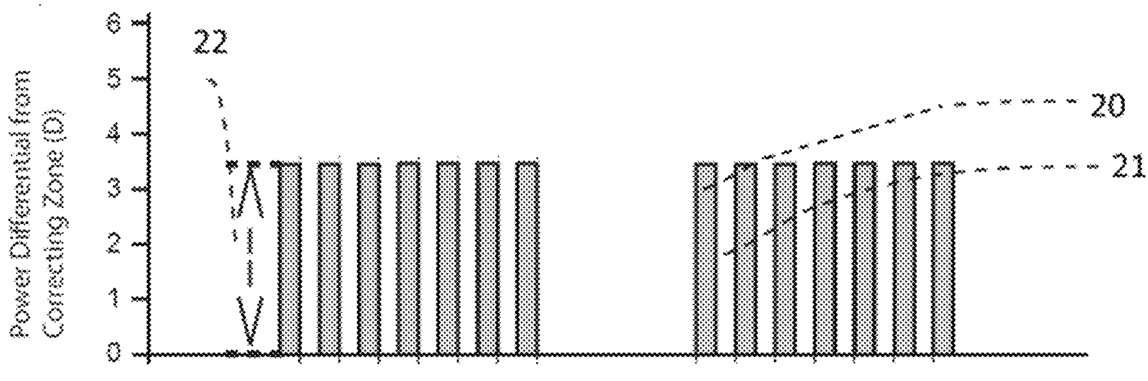
FIG. 2A shows a less desirable power profile of a dual-power contact lens of the prior art.

FIG. 2A shows a less desirable power profile of a dual-power contact lens of the prior art. In this power profile, all correcting zones 21 have the same refractive power and all defocusing zones 20 have the same refractive power. The difference in refractive power 22 between the correcting zone 21 and the defocusing zone 20 remains constant from the lens center towards the periphery.

Figure 2B:
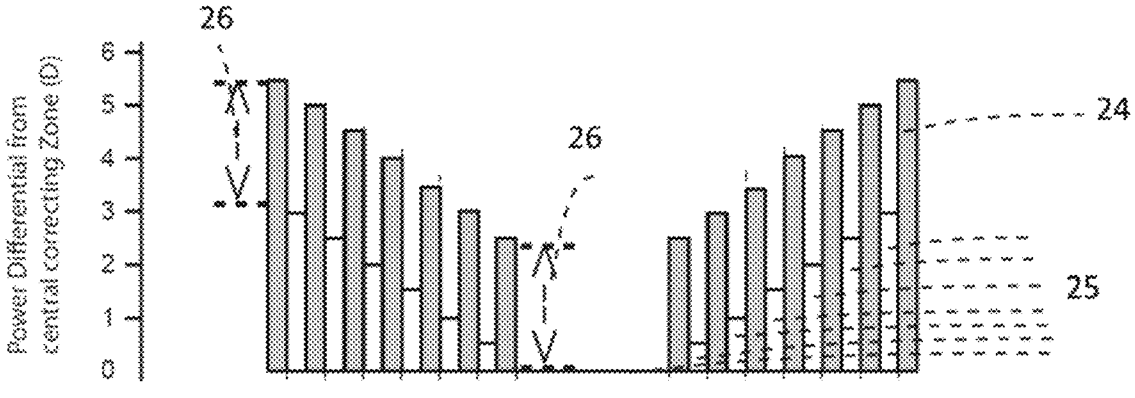
FIG. 2B shows a less desirable power profile of a contact lens of the prior art.

FIG. 2B shows a less desirable power profile of a contact lens of the prior art. In this power profile, the power of each correcting zone 25 increases in relative positive power towards the lens periphery. The increment of power is not customized according to the measured peripheral refractive error of users. Each defocusing annular zone 24 forms pairs with an adjacent correcting zone 25, and is relatively more positive than the adjacent correcting zone by a consistent amount 26.

Figure 3:
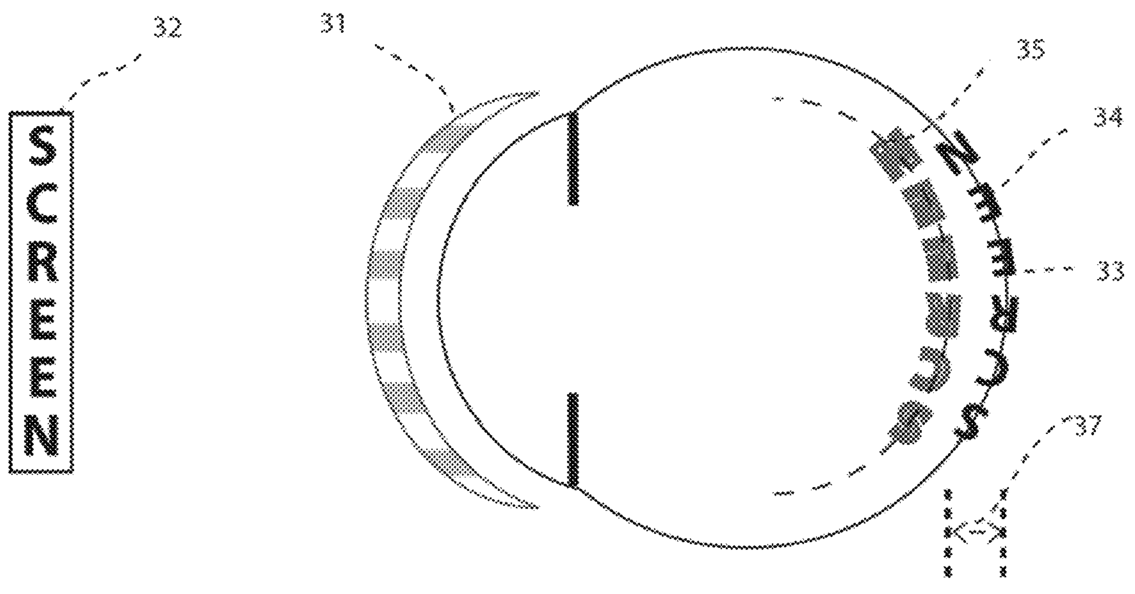
FIG. 3 depicts a myopic eye fitted with a contact lens of the prior art designed to inhibit myopia progression and ideal images formed by the contact lens.

FIGS. 3-6 illustrate image formation properties of different power profiles under different configurations. FIG. 3 shows ideal images formed from a designed lens 31 of the prior art designed to inhibit myopia progression through generation of myopic defocus and correction of existing refractive error. A plane object at distance 32, after being refracted by the designed lens 31 on the eye, forms two image shells 34, 35. The image shell 34 formed by the correcting zones is accurately focused on the retina 33 of posterior eye, while the image shell 35 formed by the defocusing zones is focused anterior to the retina. The dioptric distance between the retina and the latter image shell 35 is equivalent to myopic defocus 37, which remain relatively constant throughout the retina regardless of retinal eccentricity (distance from visual axis).

Figure 4:
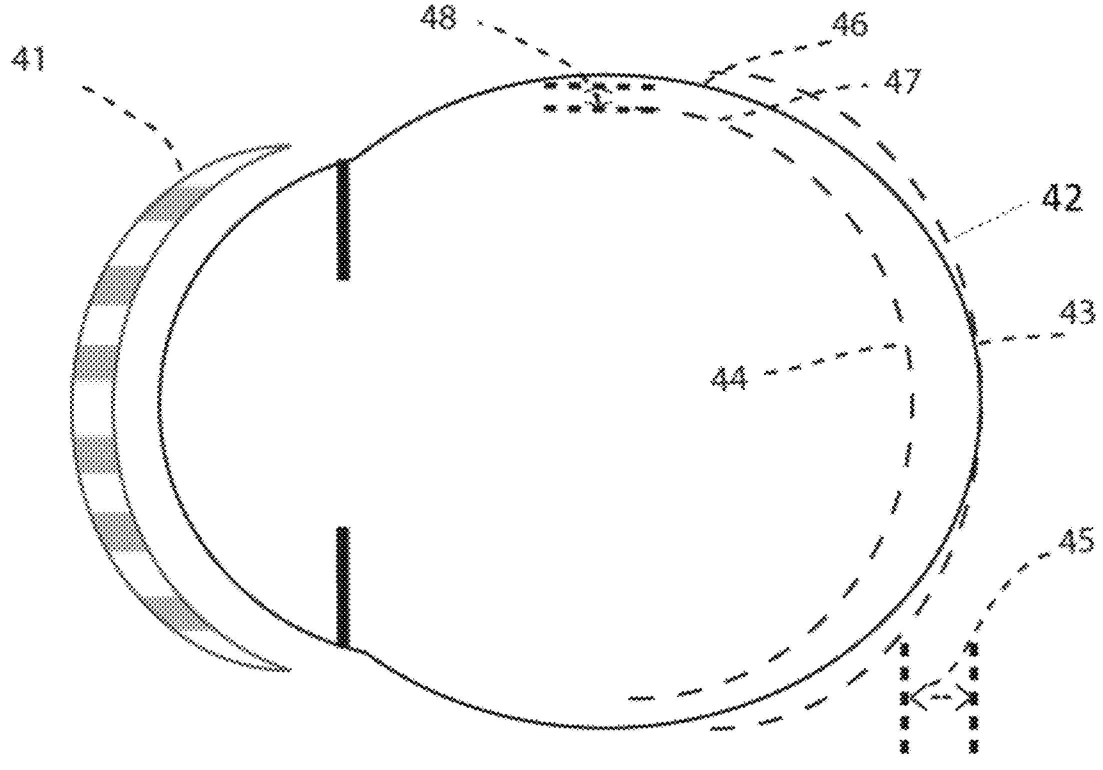
FIG. 4 depicts a myopic eye fitted with the dual-power contact lens of the prior art having the power profile of FIG. 2A and actual images formed by the dual-power lens.

FIG. 4 illustrates an actual situation when a dual-power lens 41 of the prior art is applied on eyes with relative hyperopic peripheral refractive errors. A similar distant plane object forms a posterior image shell 42 and an anterior image shell 44 after refracted by the dual-power lens 41. Similarly, the posterior image shell 42 formed by the correcting zones of the dual power lens 41 is focused on the central retina 43, while the anterior image shell 44 formed by the defocusing zones of the dual power lens 41 is focused anterior to the central retina 43. This generates the pre-designed amount of myopic defocus 45 at the central region. Due to the relative hyperopic peripheral refractive error, the amount of myopic defocus 48 generated at peripheral region of retina 46 is smaller in amplitude, because the peripheral image shell 47 is relatively close to the retina at periphery 46. As a result, the amplitude of myopic defocus 48 at peripheral retina or mid-peripheral retina is smaller than the myopic defocus 45 at the central region. Since myopic defocus is the primary factor that inhibit/retard myopia progression of an eye, such reduction in amplitude is undesirable and may reduce the overall clinical effectiveness.

Figure 5:
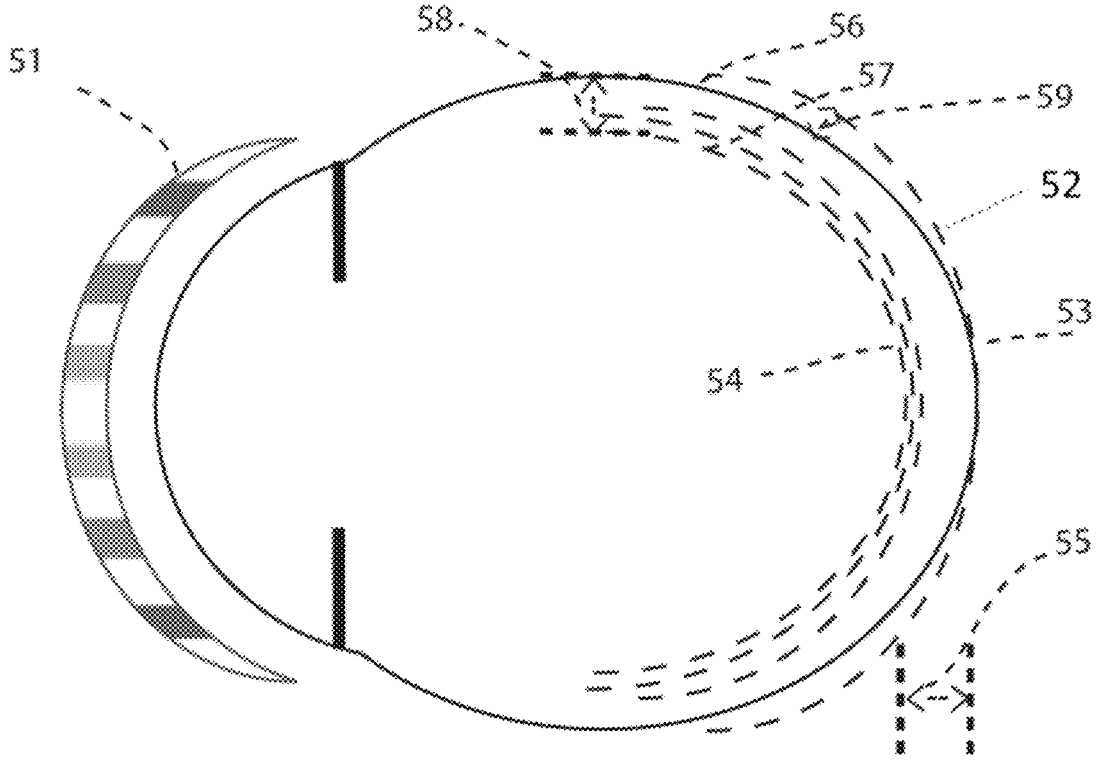
FIG. 5 depicts a myopic eye fitted with a concentric annular multi-zone contact lens according to certain embodiments of the present invention and desirable images formed by the contact lens.

FIG. 5 illustrates the preferred image formation properties of a preferred contact lens 51 according to certain embodiments of the present application. A similar distant plane object forms a posterior image shell 53 and multiple anterior image shells 54 having different dioptric distances after refracted by the contact lens 51. The posterior image shell 52 formed by the correcting zones of the contact lens 51 is focused on the central retina 53. Because the defocusing power of the defocusing zones of the contact lens 51 increases with the measured hyperopic peripheral refractive error, the multiple anterior image anterior image shells 54 are formed anterior to the retina with different dioptric distances so that each anterior image shell has its respective dioptric distance. Those anterior image shells, e.g., an anterior image shell 57 having the largest dioptric distance, formed by the most positive defocusing zones produce stronger myopic defocus 58 at peripheral retina 56 reinforcing the otherwise diminishing amount of myopic defocus. In other words, the reduction in amplitude of myopic defocus 58 at peripheral retina 56 and mid-peripheral is compensated. As a result, the amount of myopic defocus 55 at central region and the amount of myopic defocus 58 at the periphery are maintained by large. Regarding the posterior image shell 52 focused on the retina 53 at the central region, there may be a small amount of hyperopic defocus 59 near the peripheral retina 56. However it does not matter due to the presence of a reinforced amount of myopic defocus at the same region which override its myopia-inducing effect.

Figure 6:
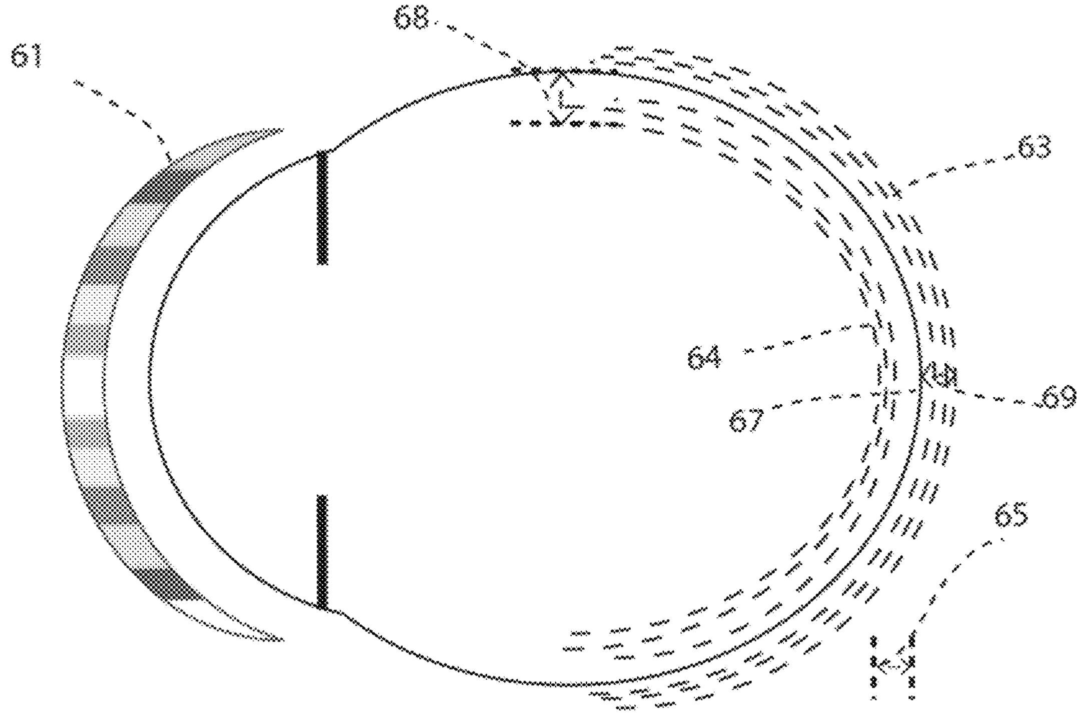
FIG. 6 depicts a myopic eye fitted with the contact lens of the prior art having a power profile of FIG. 2B and actual images formed by the contact lens.

FIG. 6 illustrates the image shells formed by a contact lens 61 of the prior art having the power profile of FIG. 2B. The correcting zones of the contact lens 61 form multiple posterior image shells 63 for visual perception, and the defocusing zones of the contact lens 61 form multiple anterior image shells 64 for myopic defocus 65. The increasing relative positive power in the defocusing zones towards the periphery may compensate for the potential reduction of myopic defocus 68 at the periphery for some eyes, or may enhance the amount of myopic defocus 68 at the peripheral for the other eyes. Ideally, a posterior image shell should be focused onto the retina with minimal error (due to accommodation lag/lead). However, the increasing relative positive power in the correcting zones with retinal eccentricity produces a side-effect. The plurality of powers in the correcting zones unavoidably produces a plurality of posterior image shells 63. The presence of the multiple posterior image shells 63 near the central retina 67 interferes the accuracy of accommodation and tends to induce accommodation lag, which eventually shifts both the anterior image shells 64 and the posterior image shells 63 toward the posterior direction, reduces the overall amount of generated myopic defocus 65, and potentially induces undesirable hyperopic defocus 69.

In contrast, referring back to FIG. 5, the constant refractive power of correcting zones in the contact lens 51 does not produce the above side-effect of extra image shells. The posterior shell image 52 is focused on the central retina 53 and the myopic defocus 55 resulted from the anterior shell 54 is not compromised. The residual amount of hyperopic defocus 59 at the peripheral retina 56 does not to play any role because of the dominating myopic defocus 58 at the same region.

Figure 7:
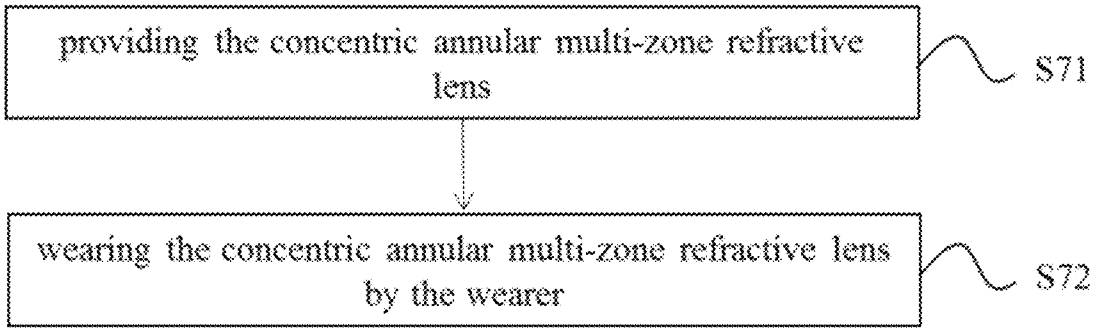
FIG. 7 is a flow chart depicting a method for retarding myopia progression in a human eye of a wearer according to certain embodiments.

FIG. 7 is a flow chart depicting a method for retarding myopia progression in a human eye of a wearer according to certain embodiments. In step S71, the concentric annular multi-zone lens described above is provided. In step S72, the concentric annular multi-zone lens is worn by the wearer for retarding myopia progression in the human eye.

Figure 8:
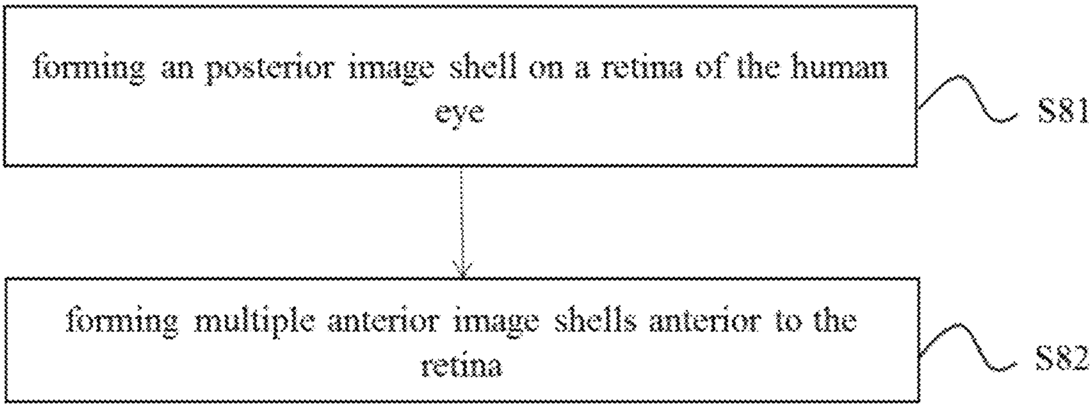
FIG. 8 is a flow chart depicting a method for retarding myopia progression in a human eye according to certain embodiments.

FIG. 8 is a flow chart depicting a method for retarding myopia progression in a human eye according to certain embodiments. In step S81, a posterior image shell is formed on a retina of the human eye so as to correct refractive error of the human eye. In step S82, multiple anterior image shells are formed anterior to the retina with different dioptric distances so as to inhibit the myopia progression, a dioptric distance between the retina and each anterior image shells being equivalent to a myopic defocus, wherein one or more anterior image shells having longer dioptric distance generate larger amplitude of the myopic defocus at the peripheral retina so as to retard the myopia progression more effectively.

Thus, it can be seen that an improved lens and method for retarding myopia progression in a human eye have been disclosed which eliminates or at least diminishes the disadvantages and problems associated with prior art processes and devices. The improved lens has a defocusing power increasing region, in which refractive powers of defocusing zones increase positively towards the periphery of the concentric annular multi-zone lens such that one or more anterior image shells formed by one or more defocusing zones having more positive refractive power generate larger amplitude of the myopic defocus at the peripheral of the retina so as to retard the myopia progression more effectively.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. A concentric annular multi-zone lens for retarding myopia progression in a human eye, the concentric annular multi-zone lens comprising:

a plurality of correcting zones for forming a focused image on a retina of the human eye so as to correct refractive error of the human eye, wherein the plurality of correcting zones has a same refractive power, and wherein the plurality of correcting zones includes a central correcting zone;

a plurality of defocusing zones for forming images anterior to the retina so as to generate myopic defocus, wherein the plurality of correcting zones and the plurality of defocusing zones are alternated in the concentric annular multi-zone lens;

a defocusing power increasing region, in which refractive powers of defocusing zones are increasingly relatively positive towards a periphery of the lens, wherein the defocusing power increasing region includes a first defocusing zone of the plurality of defocusing zones, the first defocusing zone immediately surrounding the central correcting zone such that the first defocusing zone is lowest in refractive power among the defocusing zones in the defocusing power increasing region, and wherein the first defocusing zone is more positive in refractive power than the central correcting zone; and a defocusing power constant region, in which refractive powers of defocusing zones are the same, wherein the defocusing power constant region is located after the defocusing power increasing region towards the periphery of the lens, and the refractive powers of the defocusing zones in the defocusing power constant region are the same as the refractive power of the last defocusing zone in the defocusing power increasing region, wherein the refractive powers of the defocusing zones in the defocusing power increasing region are configured to increase based on a measured relative peripheral refractive error of the human eye to compensate for diminishing myopic defocus at the periphery of the retina.

2. The concentric annular multi-zone lens of claim 1, wherein the refractive powers of the defocusing zones in the defocusing power increasing region are increased with a stepwise power increment.

3. The concentric annular multi-zone lens of claim 2, wherein the stepwise power increment is between 0.25D and 1.5D.

4. The concentric annular multi-zone lens of claim 1, wherein the defocusing zones in the defocusing power increasing region include 2 to 10 defocusing zones.

5. The concentric annular multi-zone lens of claim 1, wherein the defocusing zones in the defocusing power increasing region further comprise a second defocusing zone located after the first defocusing zone towards the periphery of the lens, the first defocusing zone having a first refractive power for forming a first anterior image shell, the second defocusing zone having a second refractive power being more positive than the first refractive power for forming a second anterior image located anterior to the first anterior image.

6. The concentric annular multi-zone lens of claim 5, wherein the defocusing zones in the defocusing power increasing region further comprise a third defocusing zone being located after the second defocusing zone towards the periphery of the lens, the third defocusing zone having a third refractive power being more positive than the second refractive power for forming a third anterior image shell located anterior to the second anterior image.

7. The concentric annular multi-zone lens of claim 6, wherein the defocusing zones in the defocusing power increasing region further comprise a fourth defocusing zone being located after the third defocusing zone towards the periphery of the lens, the fourth defocusing zone having a fourth refractive power being more positive than the third refractive power for forming a fourth anterior image shell located anterior to the third anterior image.

8. The concentric annular multi-zone lens of claim 7, wherein the first refractive power, the second refractive power, the third refractive power and the fourth refractive power are increased by a stepwise power increment.

9. The concentric annular multi-zone lens of claim 8, wherein the stepwise power increment is between 0.25D and 1.5D.

10. The concentric annular multi-zone lens of claim 5, wherein the refractive power of the first defocusing zone is relatively more positive than the central correcting zone by 1.00D to 4.0D.

11. The concentric annular multi-zone lens of claim 1, wherein the concentric annular multi-zone lens is in the form of a contact lens comprising an optical surface including 4 to 40 alternating correcting and defocusing zones.

* * * * *